United States Patent
Barnett et al.

(10) Patent No.: US 9,646,495 B2
(45) Date of Patent: May 9, 2017

(54) METHOD AND SYSTEM FOR TRAFFIC FLOW REPORTING, FORECASTING, AND PLANNING

(71) Applicant: GENERAL ELECTRIC COMPANY, Schenectady, NY (US)

(72) Inventors: Bruce Gordon Barnett, Niskayuna, NY (US); John Erik Hershey, Niskayuna, NY (US); Michael Joseph Dell'Anno, Niskayuna, NY (US); Stanislava Soro, Niskayuna, NY (US); Hartman James Michael, Clifton Part, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 14/546,256

(22) Filed: Nov. 18, 2014

(65) Prior Publication Data

US 2015/0339919 A1    Nov. 26, 2015

Related U.S. Application Data

(60) Provisional application No. 61/907,069, filed on Nov. 21, 2013, provisional application No. 61/907,078, (Continued)

(51) Int. Cl.
*G08G 1/07* (2006.01)
*G08G 1/048* (2006.01)
(Continued)

(52) U.S. Cl.
CPC ............. *G08G 1/048* (2013.01); *F21S 8/086* (2013.01); *F21S 8/088* (2013.01); *G08G 1/0116* (2013.01);
(Continued)

(58) Field of Classification Search
CPC .......... G01G 1/048; F21S 8/086; F21S 8/088; G08G 1/01; G08G 1/0104; G08G 1/04;
(Continued)

(56) References Cited

U.S. PATENT DOCUMENTS

| 4,704,610 A | 11/1987 | Smith et al. |
| 4,878,754 A * | 11/1989 | Homma ............... G01B 11/306 |
| | | 356/3.07 |

(Continued)

FOREIGN PATENT DOCUMENTS

| EP | 1437270 A1 | 7/2004 |
| EP | 2131630 A2 | 12/2009 |

(Continued)

OTHER PUBLICATIONS

Zotos, Stergiopoulos, Anastasopoulos, Bogdos, Case Study of a Dimmable Outdoor Lighting System With Intelligent Management and Remote Control, Jul. 30, 2012, pp. 43-48, Telecommunications and Multimedia (TEMU), 2012 International Conference, Chania Crete.

(Continued)

*Primary Examiner* — Van Trieu
(74) *Attorney, Agent, or Firm* — Pabitra K. Chakrabarti

(57) ABSTRACT

A street lighting and traffic control system and method employing sensor technologies. Conventional sensors and processors are linked together by a wireless mesh communications architecture that may also be interfaced through one or more gateways into one or more monitoring and control centers. Traffic flow reporting, control and forecasting using a street lighting and traffic control network that includes a series of street lighting fixtures.

20 Claims, 10 Drawing Sheets

Related U.S. Application Data filed on Nov. 21, 2013, provisional application No. 61/907,090, filed on Nov. 21, 2013, provisional application No. 61/907,114, filed on Nov. 21, 2013, provisional application No. 61/907,133, filed on Nov. 21, 2013, provisional application No. 61/907,150, filed on Nov. 21, 2013, provisional application No. 61/907,168, filed on Nov. 21, 2013, provisional application No. 61/907,188, filed on Nov. 21, 2013, provisional application No. 61/907,210, filed on Nov. 21, 2013.

(51) Int. Cl.
| | |
|---|---|
| *F21S 8/08* | (2006.01) |
| *G08G 1/01* | (2006.01) |
| *G08G 1/017* | (2006.01) |
| *G08G 1/04* | (2006.01) |

(52) U.S. Cl.
CPC ......... *G08G 1/0133* (2013.01); *G08G 1/0175* (2013.01); *G08G 1/04* (2013.01)

(58) Field of Classification Search
CPC ......... G08B 19/02; G01N 19/02; F01S 8/085; F21W 2131/10; F21W 2131/103; F21W 2131/105
See application file for complete search history.

(56) References Cited

U.S. PATENT DOCUMENTS

| | | | |
|---|---|---|---|
| 5,014,052 A | 5/1991 | Obeck | |
| 5,028,129 A | 7/1991 | Smith | |
| 5,199,044 A | 3/1993 | Takeuchi et al. | |
| 5,243,185 A | 9/1993 | Blackwood | |
| 5,345,232 A | 9/1994 | Robertson | |
| 5,519,692 A | 5/1996 | Hershey et al. | |
| 5,519,725 A | 5/1996 | Hershey et al. | |
| 5,526,357 A | 6/1996 | Jandrell | |
| 5,557,261 A * | 9/1996 | Barbour ................ G01N 21/21 244/134 F | |
| 5,563,728 A | 10/1996 | Allen et al. | |
| 5,563,906 A | 10/1996 | Hershey et al. | |
| 5,568,507 A | 10/1996 | Hershey et al. | |
| 5,568,508 A | 10/1996 | Hershey | |
| 5,568,509 A | 10/1996 | Hershey et al. | |
| 5,568,522 A | 10/1996 | Hershey et al. | |
| 5,682,100 A | 10/1997 | Rossi et al. | |
| 5,761,238 A | 6/1998 | Ross et al. | |
| 5,822,099 A | 10/1998 | Takamatsu | |
| 5,844,949 A | 12/1998 | Hershey et al. | |
| 5,852,243 A * | 12/1998 | Chang ................ B60R 16/0237 340/580 | |
| 5,903,594 A | 5/1999 | Saulnier et al. | |
| 6,011,508 A | 1/2000 | Perreault et al. | |
| 6,101,214 A | 8/2000 | Hershey et al. | |
| 6,122,084 A | 9/2000 | Britz et al. | |
| 6,288,632 B1 | 9/2001 | Hoctor et al. | |
| 6,308,134 B1 | 10/2001 | Croyle et al. | |
| 6,346,875 B1 | 2/2002 | Puckette et al. | |
| 6,424,250 B1 | 7/2002 | Puckette, IV et al. | |
| 6,430,210 B1 | 8/2002 | McGrath et al. | |
| 6,433,976 B1 | 8/2002 | Phillips | |
| 6,459,998 B1 | 10/2002 | Hoffman | |
| 6,504,634 B1 | 1/2003 | Chan et al. | |
| 6,522,243 B1 | 2/2003 | Saulnier et al. | |
| 6,659,715 B2 | 12/2003 | Kuesters et al. | |
| 6,693,556 B1 | 2/2004 | Jones et al. | |
| 6,717,660 B1 | 4/2004 | Bernardo | |
| 6,943,668 B2 | 9/2005 | Gaus, Jr. et al. | |
| 7,175,082 B2 | 2/2007 | Hoshina | |
| 7,248,149 B2 | 7/2007 | Bachelder et al. | |
| 7,294,977 B1 | 11/2007 | Eusterbrock et al. | |
| 7,418,346 B2 | 8/2008 | Breed et al. | |
| 7,460,787 B2 | 12/2008 | Damink et al. | |
| 7,580,705 B2 | 8/2009 | Kumar | |
| 7,629,899 B2 | 12/2009 | Breed | |
| 7,646,330 B2 | 1/2010 | Karr | |
| 7,817,063 B2 | 10/2010 | Hawkins et al. | |
| 7,834,555 B2 | 11/2010 | Cleland et al. | |
| 7,855,376 B2 | 12/2010 | Cantin et al. | |
| 7,876,864 B2 | 1/2011 | Conrad et al. | |
| 7,899,621 B2 | 3/2011 | Breed et al. | |
| 7,912,645 B2 | 3/2011 | Breed et al. | |
| 7,983,836 B2 | 7/2011 | Breed | |
| 8,092,032 B2 * | 1/2012 | Pearse .................... F21V 19/00 362/11 | |
| 8,138,690 B2 | 3/2012 | Chemel et al. | |
| 8,227,995 B2 | 7/2012 | Damink et al. | |
| 8,232,745 B2 | 7/2012 | Chemel et al. | |
| 8,244,260 B2 | 8/2012 | Silverstrim et al. | |
| 8,260,537 B2 | 9/2012 | Breed | |
| 8,274,373 B2 | 9/2012 | Nysen | |
| 8,339,069 B2 | 12/2012 | Chemel et al. | |
| 8,368,321 B2 | 2/2013 | Chemel et al. | |
| 8,373,362 B2 | 2/2013 | Chemel et al. | |
| 8,384,312 B2 | 2/2013 | Tsai | |
| 8,436,748 B2 | 5/2013 | Mimeault et al. | |
| 8,441,214 B2 | 5/2013 | Anderson | |
| 8,442,403 B2 | 5/2013 | Weaver | |
| 8,442,785 B2 | 5/2013 | Walters et al. | |
| 8,456,325 B1 | 6/2013 | Sikora | |
| 8,475,002 B2 * | 7/2013 | Maxik ...................... F21S 2/00 362/157 | |
| 8,641,241 B2 * | 2/2014 | Farmer ............... H05B 37/0254 362/368 | |
| 8,840,569 B2 | 9/2014 | Flaction et al. | |
| 8,842,009 B2 | 9/2014 | Jones | |
| 8,947,296 B2 | 2/2015 | Raz et al. | |
| 9,192,026 B2 * | 11/2015 | Marquardt ........... H05B 37/029 | |
| 9,192,029 B2 * | 11/2015 | Marquardt ......... H05B 37/0254 | |
| 2002/0141882 A1 | 10/2002 | Ingistov et al. | |
| 2005/0017647 A1 | 1/2005 | Huang | |
| 2005/0047864 A1 * | 3/2005 | Yamada ................. G08B 19/02 404/71 | |
| 2005/0104745 A1 | 5/2005 | Bachelder et al. | |
| 2005/0187701 A1 | 8/2005 | Baney | |
| 2007/0063875 A1 * | 3/2007 | Hoffberg ............. G08G 1/0104 340/995.1 | |
| 2007/0201540 A1 | 8/2007 | Berkman | |
| 2007/0229250 A1 | 10/2007 | Recker et al. | |
| 2008/0037241 A1 | 2/2008 | Von Der Brelie | |
| 2008/0072766 A1 | 3/2008 | Kobylarz | |
| 2008/0122642 A1 | 5/2008 | Radtke et al. | |
| 2008/0150757 A1 | 6/2008 | Hutchison | |
| 2008/0238720 A1 | 10/2008 | Lee | |
| 2009/0002982 A1 | 1/2009 | Hu et al. | |
| 2009/0033504 A1 | 2/2009 | Tsai et al. | |
| 2009/0034258 A1 | 2/2009 | Tsai et al. | |
| 2009/0066540 A1 | 3/2009 | Marinakis et al. | |
| 2009/0120299 A1 | 5/2009 | Rahn et al. | |
| 2009/0128328 A1 | 5/2009 | Fan | |
| 2009/0158739 A1 | 6/2009 | Messmer | |
| 2009/0164174 A1 | 6/2009 | Bears et al. | |
| 2009/0167508 A1 | 7/2009 | Fadell et al. | |
| 2009/0214198 A1 | 8/2009 | Takahashi et al. | |
| 2009/0267519 A1 * | 10/2009 | Pearse .................... F21V 19/00 315/117 | |
| 2009/0268453 A1 * | 10/2009 | Pearse .................... F21V 7/0025 362/235 | |
| 2009/0297156 A1 | 12/2009 | Nakagawa et al. | |
| 2010/0013608 A1 | 1/2010 | Petrisor et al. | |
| 2010/0029268 A1 | 2/2010 | Myer et al. | |
| 2010/0115093 A1 | 5/2010 | Rice | |
| 2010/0295473 A1 | 11/2010 | Chemel et al. | |
| 2010/0295474 A1 | 11/2010 | Chemel et al. | |
| 2010/0295475 A1 | 11/2010 | Chemel et al. | |
| 2010/0295482 A1 | 11/2010 | Chemel et al. | |
| 2010/0295943 A1 | 11/2010 | Cha et al. | |
| 2010/0296285 A1 | 11/2010 | Chemel et al. | |
| 2010/0301768 A1 | 12/2010 | Chemel et al. | |
| 2010/0301770 A1 | 12/2010 | Chemel et al. | |
| 2010/0301771 A1 | 12/2010 | Chemel et al. | |

(56) References Cited

U.S. PATENT DOCUMENTS

| | | |
|---|---|---|
| 2010/0301773 A1 | 12/2010 | Chemel et al. |
| 2010/0301774 A1 | 12/2010 | Chemel et al. |
| 2010/0301834 A1 | 12/2010 | Chemel et al. |
| 2010/0302779 A1 | 12/2010 | Chemel et al. |
| 2010/0308736 A1 | 12/2010 | Hung et al. |
| 2010/0309209 A1 | 12/2010 | Hodgins et al. |
| 2011/0001436 A1 | 1/2011 | Chemel et al. |
| 2011/0001438 A1 | 1/2011 | Chemel et al. |
| 2011/0001626 A1 | 1/2011 | Yip et al. |
| 2011/0043035 A1 | 2/2011 | Yamada et al. |
| 2011/0069960 A1 | 3/2011 | Knapp et al. |
| 2011/0095867 A1 | 4/2011 | Ahmad |
| 2011/0115384 A1 | 5/2011 | Chatelus |
| 2011/0140950 A1 | 6/2011 | Andersson |
| 2011/0156900 A1 | 6/2011 | Toda |
| 2011/0215736 A1 | 9/2011 | Horbst et al. |
| 2011/0227584 A1 | 9/2011 | Beck |
| 2011/0288658 A1 | 11/2011 | Walters et al. |
| 2012/0053888 A1 | 3/2012 | Staehlin et al. |
| 2012/0062123 A1 | 3/2012 | Jarrell et al. |
| 2012/0086560 A1 | 4/2012 | Ilyes et al. |
| 2012/0086561 A1 | 4/2012 | Ilyes et al. |
| 2012/0126721 A1 | 5/2012 | Kuenzler et al. |
| 2012/0136485 A1 | 5/2012 | Weber et al. |
| 2012/0140748 A1 | 6/2012 | Carruthers |
| 2012/0147604 A1* | 6/2012 | Farmer ............ H05B 37/0254 362/249.03 |
| 2012/0154239 A1 | 6/2012 | Bar-Sade et al. |
| 2012/0163826 A1 | 6/2012 | Schenk et al. |
| 2012/0209505 A1 | 8/2012 | Breed et al. |
| 2012/0218101 A1 | 8/2012 | Ford |
| 2012/0230696 A1 | 9/2012 | Pederson et al. |
| 2012/0245880 A1 | 9/2012 | Nabrotzky |
| 2012/0256777 A1 | 10/2012 | Smith et al. |
| 2012/0262304 A1 | 10/2012 | Cripps |
| 2012/0280825 A1 | 11/2012 | Sakakihara |
| 2012/0286673 A1 | 11/2012 | Holland et al. |
| 2012/0299721 A1 | 11/2012 | Jones |
| 2012/0299755 A1 | 11/2012 | Jones |
| 2012/0306382 A1* | 12/2012 | Maxik .................. F21S 2/00 315/152 |
| 2012/0308239 A1 | 12/2012 | Sheth et al. |
| 2012/0309293 A1 | 12/2012 | Kummetz et al. |
| 2012/0321321 A1 | 12/2012 | Riesebosch |
| 2012/0323474 A1 | 12/2012 | Breed et al. |
| 2013/0044488 A1 | 2/2013 | Hreish |
| 2013/0057158 A1 | 3/2013 | Josefowicz et al. |
| 2013/0063281 A1 | 3/2013 | Malaska |
| 2013/0076523 A1 | 3/2013 | Kwan et al. |
| 2013/0101003 A1 | 4/2013 | Vedantham et al. |
| 2013/0140995 A1 | 6/2013 | Jones |
| 2013/0144490 A1* | 6/2013 | Lord .................. B60T 17/22 701/41 |
| 2013/0169468 A1 | 7/2013 | Johnson et al. |
| 2013/0172012 A1 | 7/2013 | Zudrell-Koch |
| 2013/0181636 A1 | 7/2013 | Agrawal |
| 2013/0214697 A1 | 8/2013 | Archenhold |
| 2013/0221858 A1 | 8/2013 | Silberstein |
| 2013/0229116 A1 | 9/2013 | Van Zeijl et al. |
| 2013/0257284 A1 | 10/2013 | VanWagoner et al. |
| 2013/0293117 A1 | 11/2013 | Verfuerth |
| 2013/0330172 A1 | 12/2013 | Scipio et al. |
| 2013/0346229 A1 | 12/2013 | Martin et al. |
| 2014/0055439 A1 | 2/2014 | Lee et al. |
| 2014/0085055 A1 | 3/2014 | Lee et al. |
| 2014/0124007 A1 | 5/2014 | Scipio et al. |
| 2014/0125250 A1 | 5/2014 | Wilbur |
| 2014/0175982 A1 | 6/2014 | Yao et al. |
| 2014/0191858 A1 | 7/2014 | Morgan et al. |
| 2015/0023668 A1 | 1/2015 | Spaulding et al. |
| 2015/0173159 A1 | 6/2015 | Lin et al. |
| 2015/0319825 A1 | 11/2015 | Destine et al. |
| 2016/0094088 A1 | 3/2016 | Bjorn et al. |
| 2016/0095182 A1 | 3/2016 | Bjorn et al. |

FOREIGN PATENT DOCUMENTS

| | | |
|---|---|---|
| EP | 2521426 A1 | 11/2012 |
| GB | 2403357 A | 12/2004 |
| JP | 05205193 A | 8/1993 |
| JP | 2005248607 A | 9/2005 |
| JP | 2009025209 A | 2/2009 |
| JP | 2009103497 A | 5/2009 |
| KR | 1020060008967 A | 1/2006 |
| KR | 1020060102552 A | 9/2006 |
| KR | 100986279 B1 | 10/2010 |
| WO | 2005029437 A2 | 3/2005 |
| WO | 2009148466 A1 | 12/2009 |
| WO | 2010079388 A1 | 7/2010 |
| WO | 2011142516 A1 | 11/2011 |
| WO | 2012090142 A2 | 7/2012 |
| WO | 2012140152 A1 | 10/2012 |
| WO | 2013160791 A2 | 10/2013 |

OTHER PUBLICATIONS

City & County of San Francisco San Francisco Public Utilities Commission, Wireless Control and Communication System for LED Luminaires and Other Devices, San Francisco Public Utilities Commission Power Enterprise, Jun. 8, 2012, pp. 1-18.

International Search Report and Written Opinion issued in connection with corresponding PCT Application No. PCT/US2014/066927 dated Feb. 27, 2015.

Atlas, "Optical Extinction by Rainfall", Journal of Meteorology, vol. No. 10, pp. 486-488, Dec. 1953.

Noe et al., "Global Positioning System, A Navigation Algorithm for the Low-Cost GPS Receiver", The Institute of Navigation, vol. No. 1, pp. 166-172, 1980.

Proakis, "Spread Spectrum Signals for Digital Communication," in Digital Communications, for an overview of DS theory, pp. 1-27, 1983.

Hershey et al., "Random and Pseudorandom Sequences," Data Transportation and Protection, pp. 259-310, 1986.

"Millimeter Wave Propagation: Spectrum Management Implications" published by the FCC as Bulletin No. 70, Jul. 1997.

Pang et al., "LED Traffic Light as a Communications Device", Proceedings of the International Conference on Intelligent Transportation Systems, pp. 788-793, 1999.

Mimbela et al., "A Summary of Vehicle Detection and Surveillance Technologies Used in Intelligent Transportation Systems", Southwest Technology Development Institute, pp. 1-211, Nov. 30, 2000.

Bullimore, "Controlling Traffic With Radio", IEEE Review, vol. No. 47, Issue No. 1, pp. 40-44, Jan. 2001.

Chao-Qun et al., "Application of Low-voltage Power Line Communication in a City Street Lamp Long-distance Intelligent Monitoring System", Research and Developments, 2006.

Cho et al., "Street Lighting Control Based on LonWorks Power Line Communication", Power Line Communications and Its Applications, pp. 396-398, Apr. 2008.

Awan et al., "Characterization of Fog and Snow Attenuations for Free-Space Optical Propagation", Journal of Communications, vol. No. 4, Issue No. 8, pp. 533-545, Sep. 2009.

Rich, "Light Monitoring System Keeps Glendale, Ariz., Out of the Dark", Government Technology, Oct. 24, 2011.

"Monitoring and Evaluation Protocol for the Field Performance of LED Street Lighting Technologies", Light Savers Accelerating Advanced Outdoor Lighting, Prepared by Toronto Atmospheric Fund in Partnership with Ontario Municipal Street Lighting Focus Group and Ontario Power Authority, pp. 1-32, 2011.

Qian et. al., "Based on PLC and GPRS, ZigBee street lamp wireless control system", Electronic Design Engineering, vol. No. 20, Issue No. 3, Feb. 2012.

Stevens et al., "White Paper—The Benefits of 60 GHz Unlicensed Wireless Communications" as captured by Wayback machine, SUB10 systems.com, pp. 1-10, May 7, 2012.

Caillet et al., "LonMark, the open Smart Streetlight Platform", Lonmark International, pp. 1-16, Feb. 2013.

(56) References Cited

OTHER PUBLICATIONS

After Newtown: A new use for a weapons-detecting radar?, University of Michigan, Apr. 1, 2013.
Lee et al., "Distributed dimming control for LED lighting", Optics Express, vol. No. 21, Issue No. S6, pp. 1-16, Nov. 2013.
International Search Report and Written Opinion issued in connection with related PCT Application No. PCT/US2014/066954 dated Feb. 26, 2015.
International Search Report and Written Opinion issued in connection with corresponding PCT Application No. PCT/US2014/066922 dated Feb. 26, 2015.
International Search Report and Written Opinion issued in connection with related PCT Application No. PCT/US2014/066957 dated Mar. 5, 2015.
International Search Report and Written Opinion issued in connection with related PCT Application No. PCT/US2014/066917 dated Mar. 5, 2015.
International Search Report and Written Opinion issued in connection with related PCT Application No. PCT/US2014/066337 dated Mar. 6, 2015.
International Search Report and Written Opinion issued in connection with related PCT Application No. PCT/US2014/066948 dated Mar. 9, 2015.
International Search Report and Written Opinion issued in connection with related PCT Application No. PCT/US2014/066942 dated Mar. 20, 2015.
U.S. Appl. No. 14/543,893, filed Nov. 18, 2014, Hershey et al.
U.S. Appl. No. 14/546,954, filed Nov. 18, 2014, Hartman et al.
U.S. Appl. No. 14/546,408, filed Nov. 18, 2014, Hartman et al.
U.S. Appl. No. 14/546,982, filed Nov. 18, 2014, Hartman et al.
U.S. Appl. No. 14/546,486, filed Nov. 18, 2014, Hartman et al.
U.S. Appl. No. 14/546,916, filed Nov. 18, 2014, Hartman et al.
U.S. Appl. No. 14/484,300, filed Sep. 12, 2014, Hartman et al.
U.S. Appl. No. 14/546,856, filed Nov. 18, 2014, Hartman et al.
US Non-Final Office Action issued in connection with related U.S. Appl. No. 14/484,300 on Dec. 4, 2015.
US Non-Final Office Action issued in connection with related U.S. Appl. No. 14/546,982 on Feb. 1, 2016.
US Non-Final Office Action issued in connection with related U.S. Appl. No. 14/546,954 on Apr. 20, 2016.
US Non-Final Office Action issued in connection with related U.S. Appl. No. 14/543,892 on May 9, 2016.
US Non-Final Office Action issued in connection with related U.S. Appl. No. 14/546,916 on May 11, 2016.
Notice of Allowance Office Action issued in connection with related U.S. Appl. No. 14/543,892 on Aug. 26, 2016.

\* cited by examiner

METHOD AND SYSTEM FOR TRAFFIC FLOW REPORTING, FORECASTING, AND PLANNING

This application is a non-provisional of and claims the benefit of U.S. Provisional Patent Applications Ser. Nos. 61/907,069, 61/907,078, 61/907,090, 61/907,114, 61/907,133, 61/907,150, 61/907,168, 61/907,188 and 61/907,210 filed on Nov. 21, 2013, the entire contents of which are incorporated herein by reference.

BACKGROUND

The continuing development and availability of new communication and control technologies provide a constant source of candidate devices and techniques for improving infrastructure. Wireless mesh network communication is a particularly useful technology for infrastructure application as it is the nature of mesh interconnection, sometimes called a mesh cloud, to impart reliability and redundancy for the communications mission, the very etiology of the network. Mesh networks may be easily instituted to provide high bandwidth communications and network control may be decentralized or centrally managed. Sensor technology also continues to offer new techniques and devices to sense and measure environmental variables and system conditions. Cost for performance continues to decline. Adjuncting both of these technologies is the national treasure of the Global Positioning System (GPS) that provides position information as well as highly accurate time information to its users. Here too, the cost of a receiver for the GPS system has dramatically declined.

Two infrastructures that can immediately benefit from the progress of these technologies are street lighting control and traffic control in large urban areas. Conventional street lighting, such as provided by incandescent, mercury vapor, and even efficient high pressure sodium lamps, consumes significant energy per year and total energy costs can be staggering for large urban areas. For example, Los Angeles currently has approximately 209,000 street lights that use 197,000,000 kilowatt-hours of electricity per annum. A large recurring energy cost such as this continues to motivate more efficient energy lighting systems. With the conversion of street lighting to LED technology, municipal lighting budgets should see very significant reductions in operating and maintenance costs, and some expect that conversion breakeven points may appear in as little as five years.

Improved traffic control systems and techniques should also better husband natural resources. There are about 50 million traffic lights in the US in place at intersections, pedestrian crosswalks, train crossings, and other locations on the roadways. The majority of these are for controlling signalized intersections. A 1995 report of the Center for Transportation Research at the University of Texas, Austin, declared that, in general, "criteria for evaluating the effectiveness of signalized intersections are: (1) minimization of total or stopped delay, (2) reduction of numbers of stops (3) minimizing a combination of delay, and numbers of stops, (4) minimizing fuel consumption, (5) cost-efficiency, and (6) tradeoffs of these factors." It was estimated in 2002 that motorists in the 85 largest US metropolitan areas suffered delays totaling 3.5 billion hours costing about 5.7 billion gallons of fuel. Increasing the effectiveness of signalized intersections through intelligent traffic control should be of great benefit in improving US fuel usage efficiency.

BRIEF DESCRIPTION OF THE ILLUSTRATIONS

DETAILED DESCRIPTION

Described herein is a joint street lighting and traffic control system employing sensor technologies. In an embodiment, conventional sensors and processors are linked together by a wireless mesh communications architecture that may also be interfaced through one or more gateways into one or more monitoring and control centers.

Figure 1:
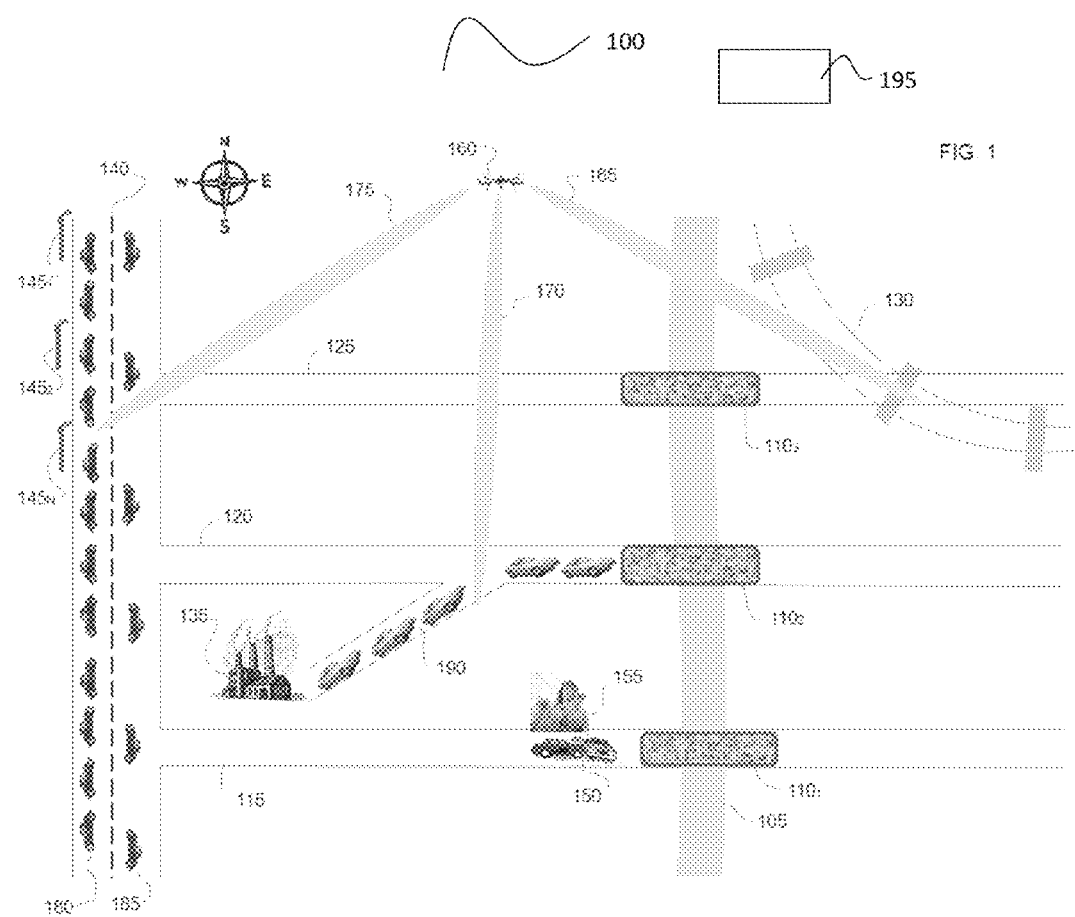
FIG. 1 illustrates a plurality of roadways and traffic conditions according to one embodiment.

An embodiment relating to traffic flow reporting, control and forecasting may be viewed by referring to the illustration in FIG. 1. FIG. 1 illustrates a street lighting and traffic control network 100 that includes a drone 160 carrying a synthetic aperture radar (SAR) system with illumination radar beams 165, 170, and 175; and a series of street lights $145_1$-$145_N$. Also illustrated in FIG. 1 are: roadways 115, 120, and 125; bridges 1101, 1102, and 1103 crossing a river 105; traffic paths 180, 185, and 190; an accident 150; a person reporting the accident 155; a factory 135; and a railroad track 130.

The street lighting and traffic control network 100 may serve numerous functional categories. Among these categories are: (1) intelligent street lighting control to make more efficient use of the available energy for lighting and better application of the lighting to serve the common welfare; (2) more efficient traffic control at signalized intersections; (3) data transportation and controls of associated sensors; and (4) miscellaneous public services spanning concerns of operational efficiency of public adapted infrastructure, community safety, and broad and timely collection, analysis, and dissemination of information of utility to the public.

Figure 2:
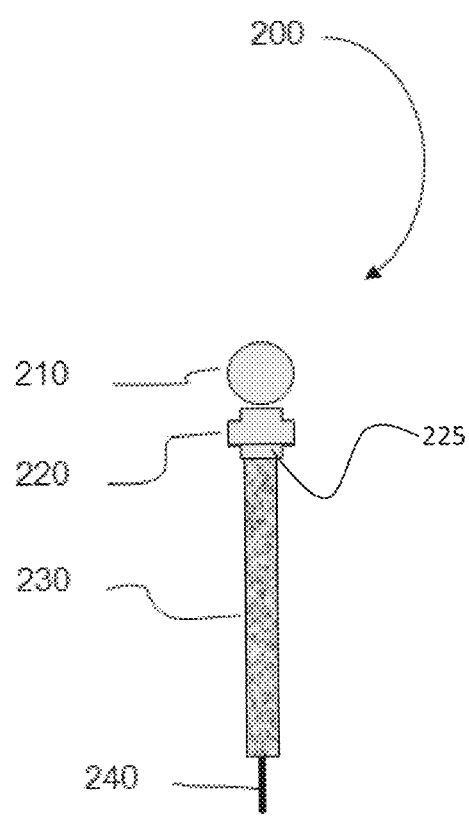
FIG. 2 illustrates the parts of a lighting fixture according to one embodiment.

An embodiment that employs street lighting fixtures within a lighting system is described by reference to FIG. 2. The street light 200 as shown in FIG. 2 includes luminaire 210, supported by a luminaire associate 220 that may comprise electronic components. The electrical components contained within luminaire associate 220 may be processing devices with associated memory resources or other computational devices, electrical circuitry, electromechanical devices and various sensors. The luminaire associate also includes mechanical devices associated with the mounting and control of the luminaire 210. The luminaire associate 220 may be mounted atop a pole 230 that also provides a conduit for the powerline 240 serving to provide power to the luminaire associate 220 and the luminaire 210. The luminaire associate 220 may also function in an urban location service by providing a transponder service. Additionally, the luminaire associate 220 may include various devices to provide an interface for sensor data obtained by the luminaire associate as well as control mechanisms the may be desirable for use within a street lighting control network.

A street lighting fixture 200 may include: one or more luminaires 210 having one or more LEDs and a luminaire associate 220. The luminaire associate 220 may provide numerous functions for: (a) applying power at one or more power levels during one or more time intervals; (b) executing one or more selectable special operational modes such as lamp flashing wherein the lamp is repeatedly turned on and off for a visual signaling purpose; and (c) include various sensor devices as well as an interface for the data and controls used by the sensors within a street lighting control network.

The luminaire associate 220 as envisioned in differing embodiments may be an application node within a wireless mesh network. A GPS receiver may be included within the luminaire associate 220 allowing the luminaire associate to be precisely located within the mesh network.

The luminaire associate 220 may also be provided with one or more data ports to provide an interface for numerous types of data ports to send and receive data in accordance with varying embodiments. While specific embodiments described herein may illustrate wireless interfaces for data ports, wired interfaces are also envisioned, such as communications across the power line. Data ports within a luminaire associate 220 can receive data from RF enabled meters that include: an electric usage meter; a gas usage meter; a water usage meter; other infrastructure elements such as traffic lights; or a combination of the foregoing.

There are many types of sensors that may be contained within a luminaire associate 220. A solid-state camera or image sensor, one or more microphones, one or more electrically powered gimbals to slew and point one or more sensors in a desired direction, electrical generation and storage devices including solar cells, batteries, capacitors, or a computational element having local memory.

Embodiments are envisioned wherein the luminaire associate 220 contains a suite of sensors including: a light intensity sensor; a lamp condition estimation sensor; or one or more environmental sensors. Environmental sensors may be used to sense and measure a variety of items associated with the surroundings. Examples of conditions that may be measured by environmental sensors include: temperature; humidity; wind velocity (speed and direction); atmospheric pressure; a one or more axis accelerometer; a one or more axis tilt sensor; chemical pollution sensors; biological pollution sensors; particulate pollutant sensors, or combinations thereof; and sensors used to determine roadway conditions.

The street lighting and traffic control system 100 may provide general and specific services for the public good. General services may be provided for various roles. An embodiment envisions providing the driving public with visual displays or wireless broadcasts on a public access channel for: traffic conditions, such as deteriorating weather; slippery road conditions; traffic jams; accidents; an expectation of sharing the roadway with emergency vehicles; roadway conditions such as newly developed potholes; expected drawbridge openings; high speed police pursuits; amber alerts; and/or special activities such as advertisements or lottery outcomes.

Additional general services may be provided in accordance with differing embodiments. Reports may be provided for controlling public irrigation in situations where water is needed due to lack of precipitation or water is not required due to local precipitation.

Another general public service that may be provided is a study of traffic flow to discern and report traffic problems. This would be of great assistance in alerting drivers of desirable traffic routes as well as those traffic routes they may wish to avoid due to congestion. For example traffic paths 180, 185 may incur heavy traffic resulting in a traffic alert 140 as seen in FIG. 1 wherein traffic path 180 is experiencing heavy traffic and traffic path 185 is experiencing light traffic. The street lighting and traffic control system 100 may provide interfaces with one or more monitoring and control centers 195 to provide details of traffic alert 140.

An interface may be provided to provide data from image sensors contained within the luminaire associates 220 on street lights $145_1$-$145_N$ or data gained from the radar beam 175 from SAR 160. The interface in one example is with a broadcasting company that can provide traffic information for drivers alerting them of traffic congestion in one of the lanes as illustrated in traffic alert 140. The interface may alternatively be more localized using luminaire associates 220 on street lights $145_1$-$145_N$ to provide data related to traffic pattern 140 to an illuminated sign along the side of the road.

As another non-limiting example, the street lighting and traffic control system 100 might be used to recognize persistent non-standard vehicle maneuvering indicative of the presence of a stalled vehicle, an occurrence of an accident, impaired driver, or a significant problem with the roadway surface such as a developing pothole. This type of maneuvering is a non-standard maneuvering that may illustrate or result in abnormal traffic flow.

Another general public service may be provided using an image sensor or solid state camera to obtain images of vehicles on the roadway and forwarding those images to one or more of the monitoring and control centers 195. The image data may be transmitted either as uncompressed or compressed image data. The image data may be transmitted in specific formats to ease processing at the monitoring and control centers. Further analysis of the transmitted image data at monitoring and control centers may be used to assist law enforcement efforts or be used for other public safety actions. The transmitted image data may be used to detect suspicious vehicles or to detect ongoing violations. Violations that could be detected may be issues related to geofencing for particular vehicles. Ordinances may be in effect to ensure that certain vehicles, such as those carrying hazardous loads, do not venture into heavily residential areas or areas where transit is prohibited such as tunnels, refinery properties, or pipeline terminations and crossings.

General public services may be provided for various purposes. For example and not intended to be limiting, image data may provide information related to ongoing situations. Other sensor technologies may also be employed, such as acoustic sensors. The acoustic data may transmitted in a manner similar to that of previously discussed image data. Processing may be performed on the acoustic data at the monitoring and control centers 195 using parameters and thresholds to determine if unusual activity is occurring. Analyzing pedestrian calls for help, screams, or other types of urgent sounds for aid may be used to trigger acoustic loudness thresholds, interpreted by voice recognition to be an urgent situation or be monitored in real time by operators at the monitoring and control centers. Acoustic sensors may be used to create a security service that senses developing or in-progress urgent situations such as accidents, violent crime, persons in distress or other situations by receiving and analyzing pedestrian calls and ambient sounds in the area. In an embodiment, one or more microphones may be placed in a luminaire associate 220 that could pick up the sounds. These sounds could be analyzed locally or sent as compressed or uncompressed data to one or more of the monitoring and control centers for further analysis and possible law enforcement or public safety action.

In another embodiment, electrically powered gimbals 225 may be used to control the position of the luminaire associate 220 components and/or the lamp 210. The gimbals 225 may controlled locally enabling the luminaire associate components to rotate automatically in a desired direction. The desired direction may be in the direction of sound indicating urgency as determined by local processing. Local processing may employ parameters and/or thresholds to determine urgency as well as point of origin of sensed sounds. The gimbals 225 may be remotely controlled from the one or more monitoring and control centers to slew and point one or more of the microphones and/or the image sensor or solid-state camera in the direction of the urgent sound, such as an audible cry for help, sound of an accident or other distressing sound. One or more of the lamps in the street lighting system may be commanded to enter a special operational mode such as lamp flashing wherein the lamp is repeatedly turned on and off to visually signal the approximate location of the disturbance.

General public services may be provided in the form of a traffic pattern analysis service. Traffic patterns may be analyzed and reports generated through observations of images transmitted by the luminaire associate. The image data may be used to catalog the traffic paths of individual vehicles by building a database of specific vehicles, using their license plates for identification, and their paths through the monitored roadways in the city. By analyzing the individual vehicles' typical paths, it may be possible to determine the probabilities that individual vehicles will turn at various signalized intersections. As a non-limiting example, if it is determined that a long vehicle, such as an 18-wheel truck, is expected to make a left turn at a particular intersection, the traffic signals may operate in such a manner that the truck will have a minimum possible impact on the traffic flow. This could be done by, for instance, sequencing the traffic signals to place the truck at the intersection where it is expected to turn so that its turn does not unnecessarily delay traffic behind it.

Specific services may include but are not necessarily limited to using a solid state camera or image sensor to acquire images of license plates. These images may be used to detect violations of geofencing for particular vehicles. This might be an offering for a paid subscriber usage. Companies may desire assurances that company vehicles remain inside an expected perimeter. Evidence of a violation might aid the company in enforcing company policy for not violating geofencing regulations. Evidence presented by companies with geofencing policies may assist a company in defending against a respondeat superior tort action involving a company vehicle or company worker engaged in detour or folly.

License plate images may be of assistance to law enforcement for punishment and fee collection for exceeding the speed limits. By identifying a vehicle through an image of its license plate and successively measuring its location, it is possible to determine the speed profile of its journey. A ticket could be generated if the specific vehicle exceeds the speed limit or an even more sophisticated fee procedure could be provided. As a non-limiting example, it would be possible to bill a vehicle's owner for a fine based on the amount of time that the vehicle exceeded the speed limits by given amounts, select the highest penalty amount, or detect multiple infractions.

Messaging to and from individual vehicles may be accomplished by associating the vehicle's license plate number with the vehicle owner's IP address. Such an association file may be maintained for example, and not by way of limitation, at one or more of the monitoring and control centers. The messaging to a specific vehicle, equipped with a suitable optical communication system, might, for a non-limiting example, be done by modulating one or more of the LED lamps in a traffic signal in optical view of the vehicle as suggested in the article "LED Traffic Light as a Communications Device," by Pang et al, in proceedings of the International Conference on Intelligent Transportation Systems, 1999, pp. 788-793, the contents of which are hereby incorporated by reference. It is envisioned that with a traffic light also equipped with an optical receiver, the vehicle may send data in reply or originate a data message transmission using the traffic light as an access point to a data gateway.

The street lighting and traffic control system may be designed to satisfy more system criteria including: (1) ease of maintenance, (2) infrastructure hardening, and (3) communications security features.

The street lighting and traffic control system may be designed so that individual lamps can monitor their own health status which may include such data as: lamp functionality, for example, burn-outs and reduced lumen output; prognostics for expected remaining lamp life; and structural integrity.

The street lighting and traffic control system may also be designed to provide that electrical power analysis including, for non-limiting examples, power quality measurements and power failures. Power failures may be reported to the one or more of the monitoring and control centers as individual street light or traffic signal reports or, by virtue of a power-failure reporting protocol enabled by nature of the mesh network, informing via one or more perimeters of street lights or traffic signals, wherein each street light or traffic signal within the one or more perimeters is without power.

Additionally, the street lighting and traffic control system may be designed to perform self-checking routines that may be self-initiated or initiated by command from the one or more monitoring and control centers, such routines to assess and report to the one or more monitoring and control centers specific measured parameters of the street lights or traffic signals.

The street lighting and traffic control system may also be designed so that the street lighting and traffic control system infrastructure is hardened so that it exhibits: graceful degradation under single or multiple progressive failures, i.e., single failures will not cascade resulting in a multiplying of failures; "operate through" functionality, i.e., its operation will not be excessively slowed or impeded under graceful degradation; needed repairs may automatically be prioritized and reconstitution effected according to critical-to-quality driven algorithms that alert and propose repair actions and schedules according to conditions sensed and measured by the infrastructure awareness data gathered by the suite of sensors comprised of the street lighting units. The repair and reconstitution actions and schedules may be designed to maximize the probability that the street lighting and traffic control system will maintain its hardened character as it undergoes repair.

The street lighting and traffic control system may be designed so that the street lighting units and traffic control signals are provided with security devices and measures. The security devices and measures may be those that: detect, log, and alert the one or more monitoring and control centers to physical entries within predetermined perimeters of the street lighting units and traffic control signals. Another type of security measure would be to protect communications by encryption, or other suitable communication security measures. Security measures may be applied to the traffic that traverses the mesh network and gateway interfaces to promote privacy of personal information and reduces the ability for an interloper to exploit, insert, deny, or otherwise modify such traffic. Other embodiments provide security devices and measures for authentication of commands and messages. Commands and messages that attempt to alter, augment, delete, disable, or otherwise modify software, firmware, or hardware within the street lighting and traffic control system may be authenticated. Such authentication techniques may be provided, for a non-limiting example, by the use of key-management cryptographic techniques and secret-sharing protocols.

Finally, a traffic planning system may be provided to enable traffic engineers and urban planners to use an archival traffic database to posit and evaluate changes to the traffic infrastructure.

If a roadway surface and the air above it contains water in either liquid form, snow or ice, there is an increased hazard of vehicle mishaps. Detection of such roadway interfaces and disseminating knowledge of them to drivers on these roadways helps in safeguarding lives and property. This type of information is helpful to traffic flow reporting and forecasting.

The optical and microwave properties of water, snow and ice enable their detection by electromagnetic means. The differentiation between water, snow and ice may be aided by the fact that the permittivity of water differs to that of snow or ice. The permittivity of water is eighty times that of air, compared to the permittivity of ice which is only six times that of air. Also, hexagonal ice crystals have intrinsic birefringent properties and detection of ice is therefore possible by using polarized light.

Figure 3:
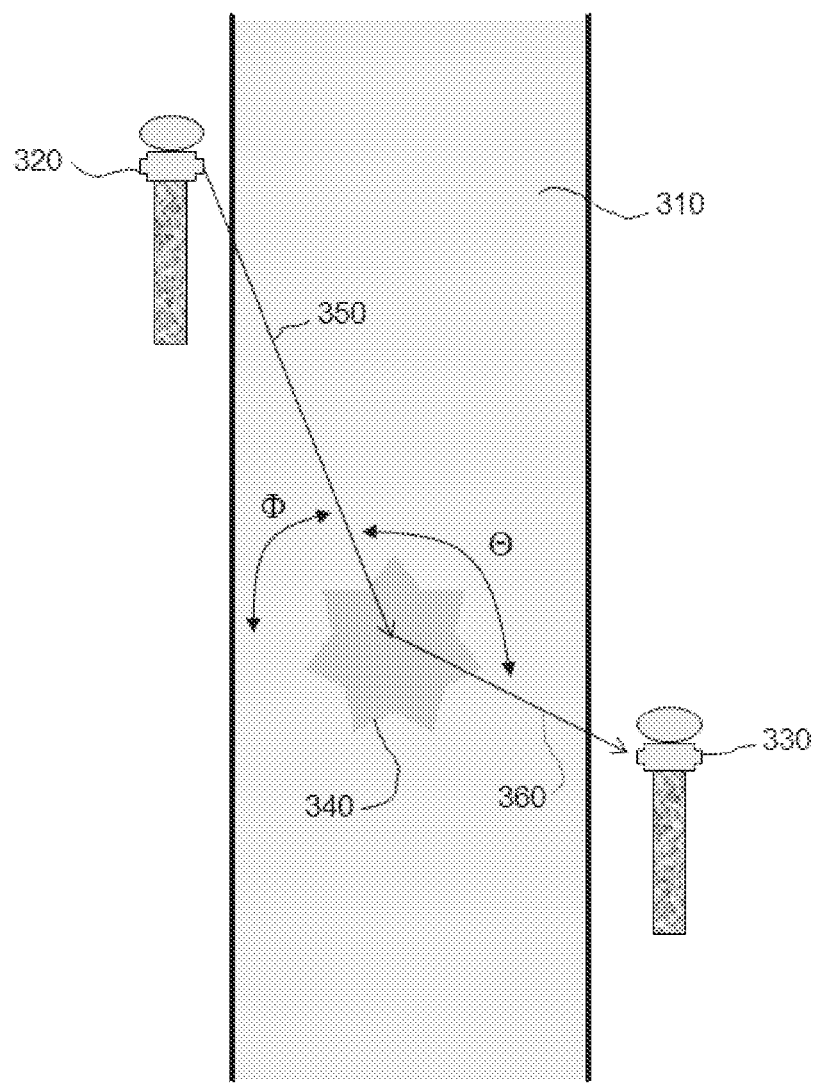
FIG. 3 illustrates detection of water on a roadway surface according to one embodiment.

In an embodiment, water on a roadway surface may be detected by an optical or millimeter wave transmitter and receiver placed within the luminaire associates, respectively 320 and 330, of two separate lighting fixtures as illustrated in FIG. 3. As an example and not by way of limitation, the transmitter and receiver are located on opposite sides of a road 310. The transmitter emits a beam of radiation 350 towards the road 310. The center of the beam of radiation 350 strikes the road 310 at the angle $\Phi$ with respect to the direction of the roadway 310. FIG. 3 illustrates a patch of water 340 on the road surface. The receiver in luminaire associate 330 receives some of the radiation 360 scattered from the interaction between the beam of radiation 350 and the patch of water 340. The receiver in luminaire associate 330 has its antenna oriented at angle $\Theta$ with respect to center of the beam of radiation 350. The scattered radiation 360 is processed to reveal the presence of the water by using the change in scattering observed relative to a dry surface and the inferred water on the road surface may be reported to a Traffic Condition Database through a lighting control network.

Figure 4:
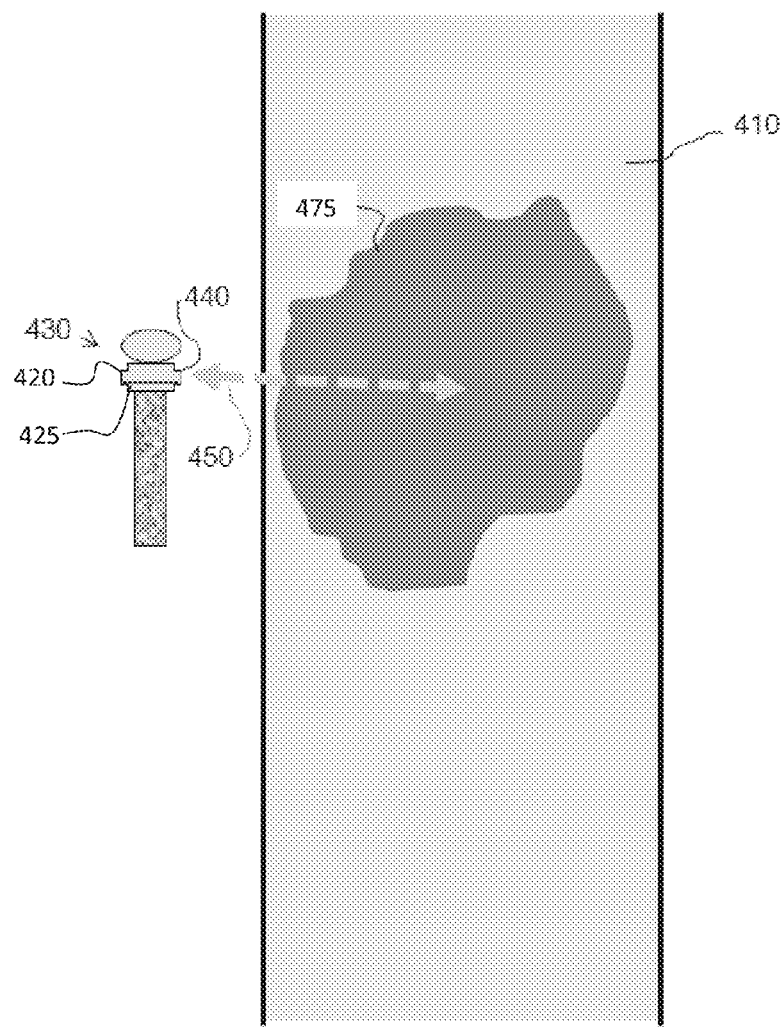
FIG. 4 illustrates detection of water or ice on a roadway surface according to one embodiment.

In another embodiment, a roadway may be investigated by illuminating the roadway surface with a linearly polarized beam of radiation as illustrated in FIG. 4 to check for deposits of ice, snow or water. Lighting fixture 430 comprises a luminaire associate 420 that may further comprise a collocated or monostatic, radiation transmitter and receiver 440. The monostatic radiation transmitter and receiver may be alternatively mounted on a support structure for lighting fixture 430. One or more motorized gimbals 425 are mounted so that the monostatic radiation transmitter and receiver 440 may be rotated to produce, transmit and receive patterns 450 in such a manner as to be able to scan an area of the roadway 410 encompassing the area 475. The controller for the gimbals 425 may run a search pattern that is stored in the luminaire associate 420 or control of the gimbals 425 may be done remotely via electronic signaling from a control center.

The monostatic radiation transmitter and receiver transmits linearly polarized radiation towards an area 475 of the roadway 410. If the area 475 is icy, then, as taught in U.S. Pat. No. 5,243,185 (incorporated by reference), the birefringent property of the hexagonal crystalline structure of ice causes the incident linearly-polarized radiation to become elliptically-polarized radiation upon return (via either reflection or refraction). By using signal processing techniques taught in U.S. Pat. No. 5,243,185, it may be determined if the area 475 has a deposit of ice or water. Traffic flow may also be estimated using the radar to detect and measure changes in the transmit and receive patterns 450 for the return radiation which would indicate a vehicle passing. The results produced by the processed sensor data may be entered into the Traffic Condition Database maintained at a remote location through a lighting control network.

Figure 5:
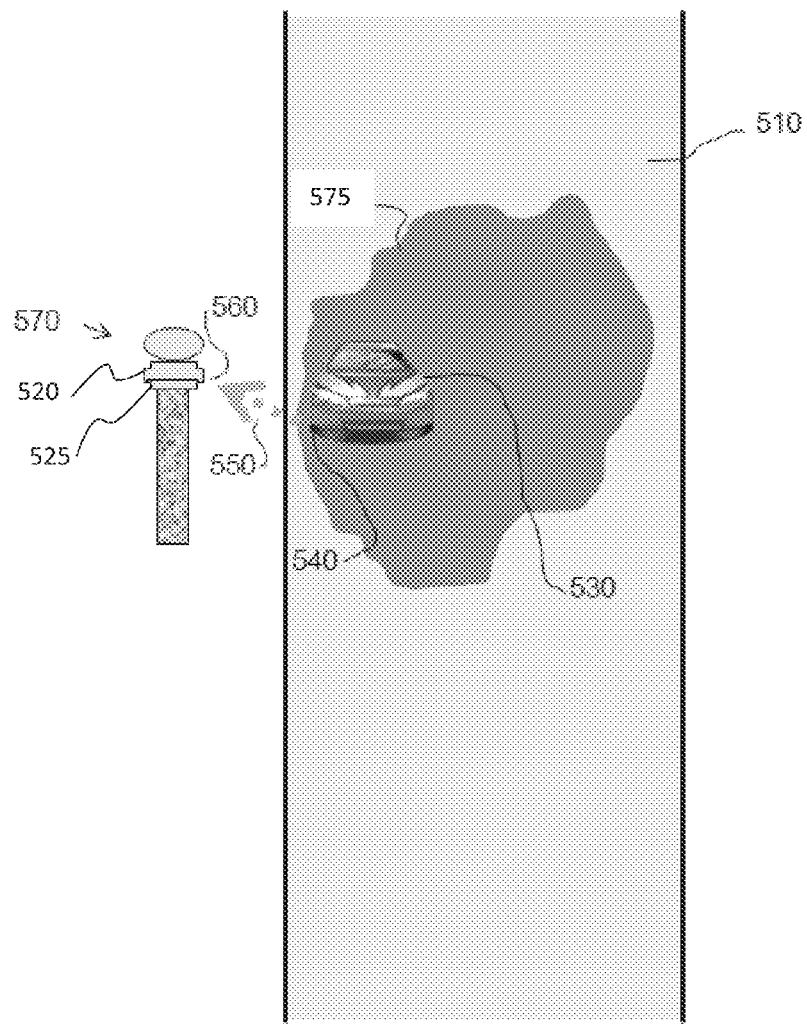
FIG. 5 illustrates acoustic tire noise detection according to one embodiment.

In yet another embodiment, sensor data may be produced by a road noise sensor located on a structure near a roadway. Sensor data gathered from the road noise sensor may be indicative of a dangerous situation on the roadway surface such as rain, snow, or ice. As illustrated in FIG. 5, road noise 550 is produced by a tire 540 of a vehicle 530 traveling over a rain, snow or ice covered roadway area 575. The road noise 550 produced from vehicle tires traveling on a dry surface is different from a surface covered in rain, snow or ice. A lighting fixture 570, proximate to the roadway 510, may have a luminaire associate 520 containing a road noise sensor 560. Additional embodiments may have the road noise sensor 560 located elsewhere on lighting fixture 570. Still additional embodiments may have a road noise sensor 560 not actually mounted on or within the luminaire associate but instead mounted remotely and located in the vicinity of the luminaire associate 520. In embodiments that employ a remotely mounted road noise sensor 560, an interface may be established between the road noise sensor 560 and the luminaire associate 520 that enables communication. The road noise sensor 560 may be an acoustic to electric transducer such as a generic microphone or a specialty microphone such as a highly directional shotgun microphone.

The road noise sensor 560 is capable of detecting a vehicle traveling on roadway 510. Processing capabilities within luminaire associate 520 processes the signal from the road noise sensor 560 to detect changes in road noise 550. In an embodiment, wet surfaces, snow and ice result in an increase in the road noise 550 created from vehicle 530 traversing road area 575. The road noise sensor 560 detects the increase in road noise. The road noise sensor 560 can track the vehicle by having a processor programmed to orient the road noise sensor 560 towards the track of the detected vehicle by orienting the road noise sensor 560 using one or more motorized gimbals 525.

The acoustic signal 550 may be locally or remotely processed (using signal processing techniques such as those described in U.S. Pat. No. 5,852,243, the contents of which are hereby incorporated by reference) to determine if the roadway area 575 has a potentially hazardous deposit of rain, ice or snow. The determination of the presence of a hazardous deposit of rain, ice or snow may be reported to the Traffic Condition Database through a lighting control network.

In another embodiment, a street light may have a noise sensor 560 used to detect and track vehicles using one or more motorized gimbals 525 rotate the noise sensor 560 as described above in relation to FIG. 5. A monostatic radiation transmitter and receiver 440, similar to that discussed in relation to FIG. 4 above, may also be included to transmit radiation towards the area of the road identified by the noise sensor 560 has having either water, ice or snow on it. If the area 475 is icy, then, it may be determined if the area 475 has a deposit of ice, snow or water on it. Traffic conditions may also be estimated using the radar to detect and measure road conditions more accurately by having rotated gimbals 525 allowing radiation transmitter and receiver 440 to focus on that specific area that noise sensor 560 has determined has either ice, snow or water on it.

Another embodiment envisions that a mesh network of smart street lights have noise sensors and radiation transmitters and receivers spread within a relatively close vicinity along a roadway. The different sensors may be used in conjunction with one another to identify potential hazardous areas on the road or other types of dangerous situations, such as a criminal acts.

Figure 6:
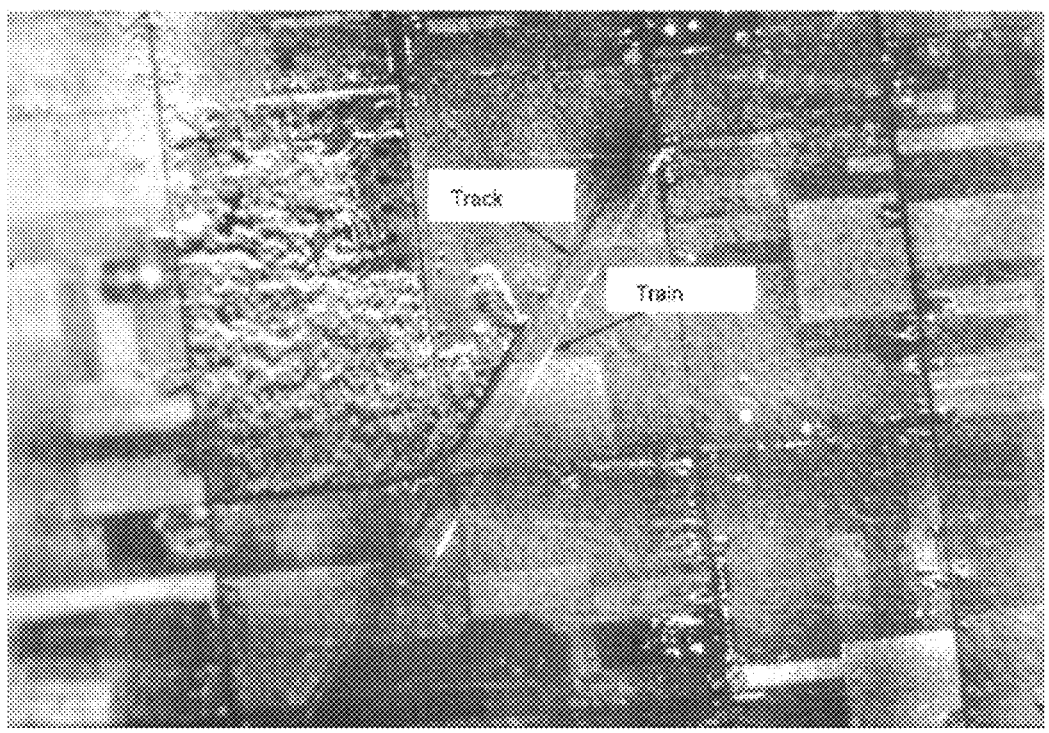
FIG. 6 illustrates an artifact in a SAR image according to one embodiment.

In an embodiment, sensor data for estimating traffic flow may also originate from an airborne drone equipped with a Synthetic Aperture Radar (SAR) system and SAR image processor. As illustrated in FIG. 1, a drone 160 carries a SAR system that may form and process images derived from areas illuminated by directional radar beams 165, 170, and 175. It is a known property of SAR imagery that a SAR image of a target that is moving may be displaced from its true location by a distance that is a function of its velocity. An example of this effect is shown in FIG. 6 where a moving train appears to be spatially displaced from its track. In an embodiment, the drone carried SAR system and SAR image processor may be similarly used to estimate the speed of vehicles traveling on a roadway. Another embodiment may determine the average speed of several closely spaced vehicles moving in essentially the same direction at approximately the same speed. Results of the SAR image analysis may be broadcast to ground receiving stations and the data entered into the Traffic Condition Database.

Figure 7:
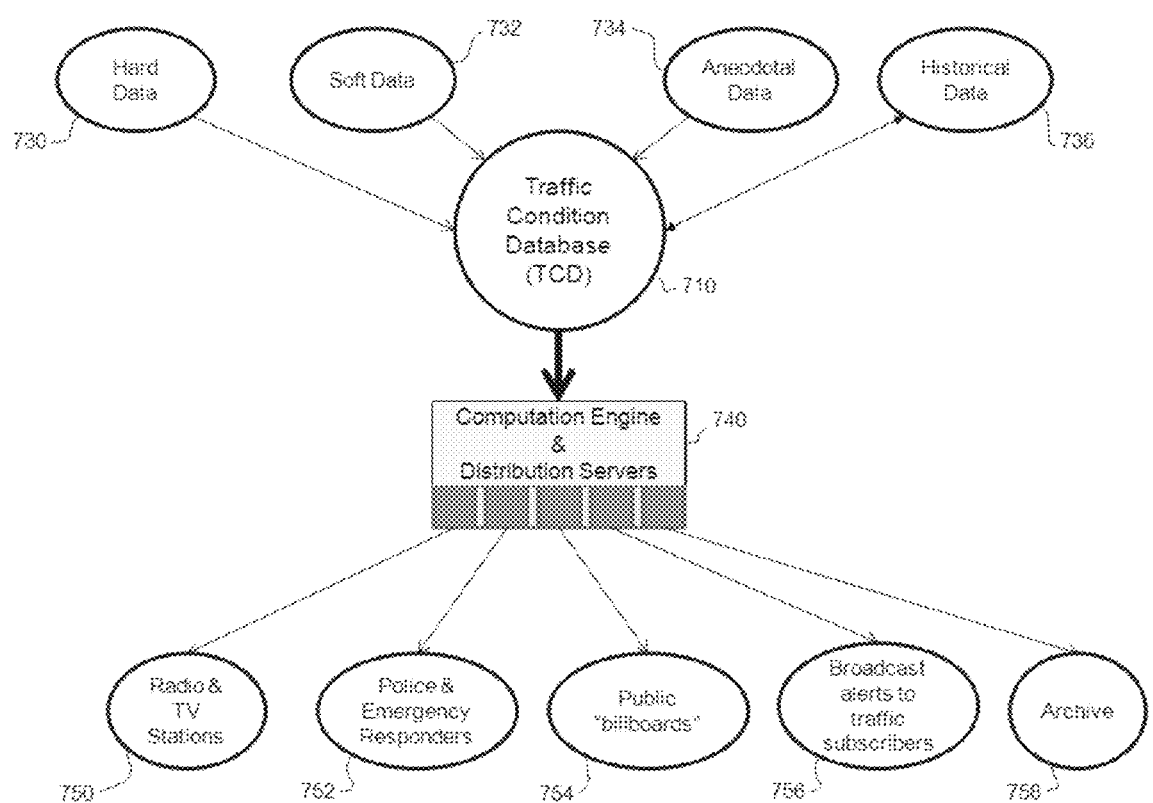
FIG. 7 illustrates the Traffic Condition Database according to one embodiment.

Illustrated in FIG. 7 is an embodiment for a Traffic Condition Database (TCD) 710 that gathers information from a plurality of data classes. A first class of data is hard data 730. Hard data may comprise data originating from sensors such as traffic counters, speed estimators, roadway condition monitors, and weather condition sensors.

A second class of data is soft data 732 that comprises unstructured or free-form data such as data derived from spoken reporting as, for example, wireless emergency responder communications and surveillance helicopter traffic reports.

Figure 8:
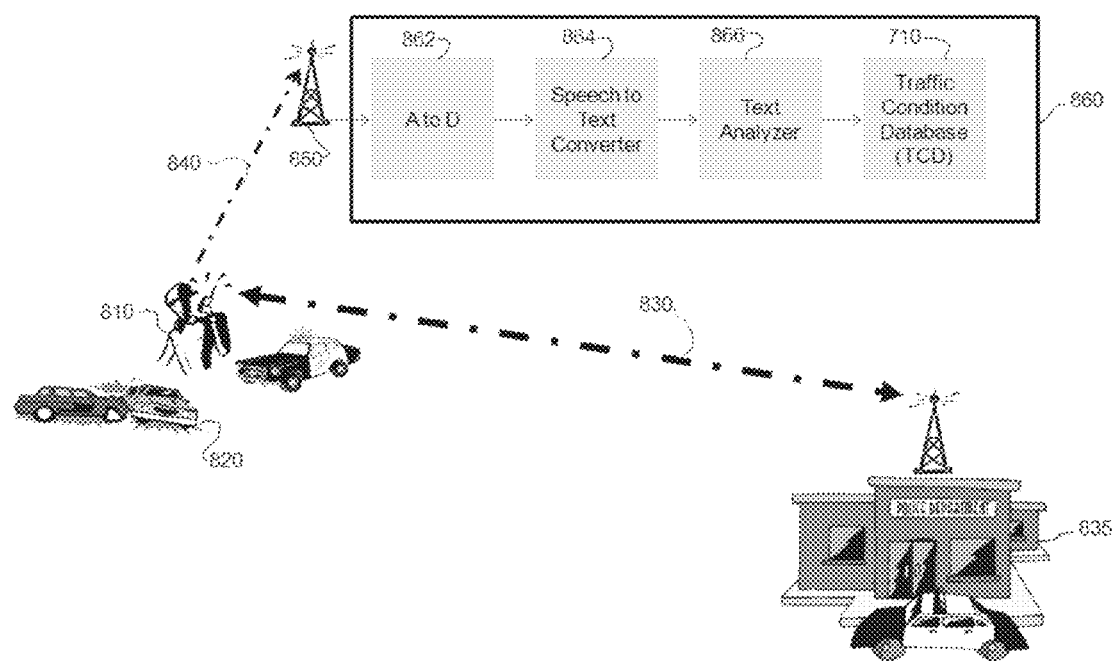
FIG. 8 illustrates the production of soft information from wireless voice according to one embodiment.

Spoken messages from sources such as emergency responders reporting by radio may be extremely valuable for inferring information about traffic conditions. Much of this emergency radio reporting is done without a strict format because it originates from a human talking Substantial advances in signal processing have made voice recognition possible wherein algorithms convert acoustically derived human speech to digitally represented words. Once the words of a spoken message are in digital form, a contextual analysis algorithm may reveal the meaning and context of the message. Once the context of this data is derived, it may be forwarded to the TCD 710 to be incorporated as soft data. The process is illustrated in an example illustrated in FIG. 8, wherein, a police officer 810 at the scene of an accident 820 reports observations via wireless communication 830 to a police facility 835. An antenna and radio receiver 850 configuration monitors police communications by receiving the broadcast signal 840 and passing the broadcast signal 840 to voice analysis unit 860. The voice analysis unit 860 comprises an analog-to-digital (A to D) converter 862 that may convert the analog voice signal into a digital voice signal. If the voice signal of the police officer's wireless communication 830 is already in digital form, the digital (A to D) converter 862 may be bypassed. The voice signal in digital form is presented to a speech to text converter 864 that produces the series of words spoken by the police officer 810. The words are presented to a text analyzer 866 that creates a formatted report of the incident such as location, time, and traffic implications. The formatted report is forwarded to the TCD 710 for incorporation as soft data.

Soft data sources may also include some E-ZPass and toll collection data, and traffic cam feeds. Other soft data sources may include data from activity monitors not directly related to traffic conditions but still having correlation to traffic conditions such as active subscriber levels and inter-cell handoff rates. Such data may be directly provided by the cellular provider but an approximation to it may be gained from an automated monitoring facility proximate to the cell antennas.

Anecdotal data 734 is a class of data derived from sources of unknown credibility and ad-hoc formatting such as data derived from social media networks. Metadata or hashtagging on many social media networks will allow message grouping and searching indexed by a particular hashtag.

Historical data 736 comprises data that relates to known schedules involving significant amounts of traffic such as plant shift change times, exiting schedules for large events, traffic light settings at signalized intersections, and the time intervals during which two-way streets are designated for one-way traffic. The TCD 710 also maintains and updates the historical data files 736.

The Computation Engine & Distribution Servers 740 receives data from the TCD 710 and reports traffic conditions within a local area to the local area center. The Computation Engine & Distribution Servers 740 may also estimate future conditions based on historic traffic conditions, weather conditions and other conditions in areas surrounding the local area using computerized prediction models. The Computation Engine & Distribution Servers 740 may also check the accuracy of its estimates, and refine its prediction models and the historical data.

The Computation Engine & Distribution Servers 740 may integrate available data to form predictions and projections that may be constantly refined as future data becomes available. The data integration proceeds by having the Computation Engine & Distribution Servers 740 run a plurality of traffic models in parallel, known as a model farm. Computation Engine & Distribution Servers 740 then performs a weighting and combines the outcomes of the models to form a single estimate of future traffic conditions. Some of the models may be traffic equation centered using conventional Jackson or Gordon-Newell network formulations, for example. Other models may place more emphasis on human factors and predict how drivers will respond to conditions. Still other models may model traffic as a continuum flow and disruptions as shock waves. Other models may include probabilistic models invoking accidents and microscopic models of traffic flow at signalized intersections. As time progresses the weights assigned to each model are adjusted in order to more nearly maximize the single estimate's correct prediction of future traffic conditions. The individual models themselves may also be adjusted.

The Computation Engine & Distribution Servers 740 may also periodically or aperiodically search for correlations between the data from different data sources that might aid in increasing the accuracy of predictions. These correlation searches may include investigation of correlations between data from different data classes. Additionally, the Computation Engine & Distribution Servers 740 periodically or aperiodically tests correlations that it has identified and determines if those correlations still obtain or need adjustment up to and including removal from the models.

The Computation Engine & Distribution Servers 740 may report traffic conditions and predictions to Radio & TV Stations 750, Police & Emergency Responders 752, and Public "billboards" 754 such as lighted information signs placed along roadways. The Computation Engine & Distribution Servers 740 broadcast alerts to traffic subscribers 756. The Computation Engine & Distribution Servers 740 also stores traffic conditions and predictions in an archive database 758.

The Computation Engine & Distribution Servers 740 may report numeric traffic conditions to local area centers, e.g., expected speed or expected wait times if hard data or historical data is driving the computations. If computations are driven largely by soft or anecdotal data, the reporting may use fuzzy terminology, e.g., "delays expected" or "slowdowns possible."

Figure 9:
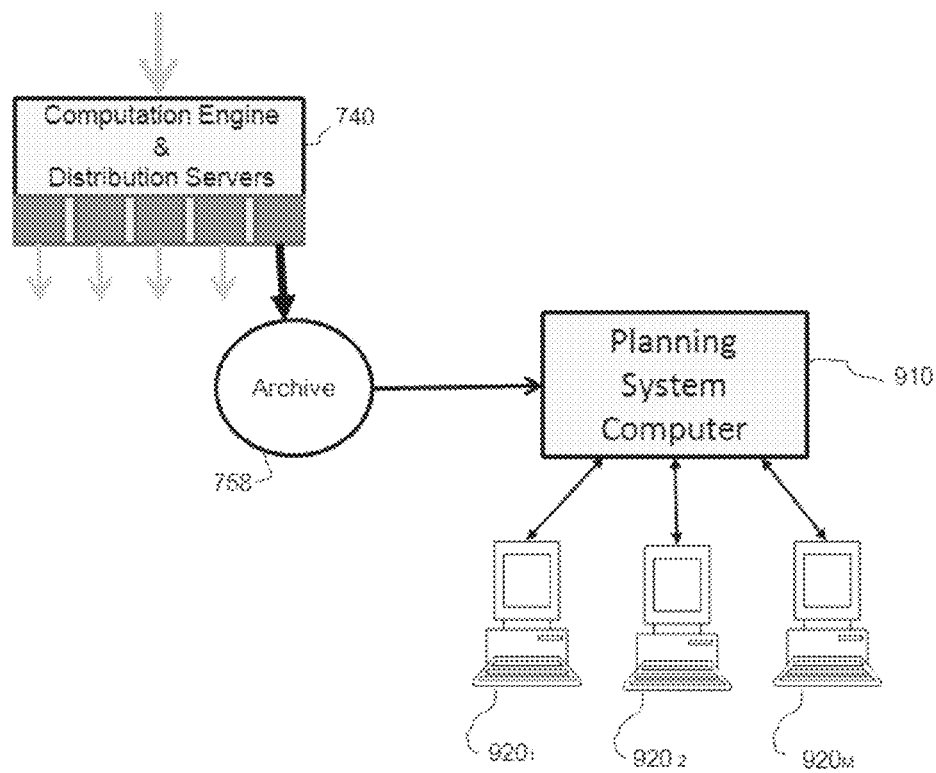
FIG. 9 illustrates a traffic planning system according to one embodiment.

Additional embodiments for traffic flow analysis and forecasting systems are envisioned such as an embodiment for a traffic planning system that enables traffic engineers and urban planners to implement databases for traffic control. An architectural and/or intersectionsignalized improvement to traffic control infrastructure is envisioned using an archival traffic database to posit and evaluate changes to the traffic infrastructure and signalized controls. As illustrated in FIG. 9, the archive database 758 is used to provide simulation data for a planning system computer 910. The planning system computer 910 interfaces with consoles 9201-920M that enables operators of these consoles to use an archival traffic base to posit and evaluate changes to the traffic infrastructure. The consoles 9201-920M may be in close proximity or distant from the planning system computer 910 in accordance with various embodiments. The operators of these consoles 9201-920M may be traffic engineers or urban planners or the operators may be in contact with engineers or urban planners. The planning system computer 910 has access to many traffic models and may run them in parallel with weightings on the individual model results in a manner, or similar to the manner, that the Computation Engine & Distribution Servers 740 integrates the data available from the archive database 758 and forms predictions and projections.

Figure 10:
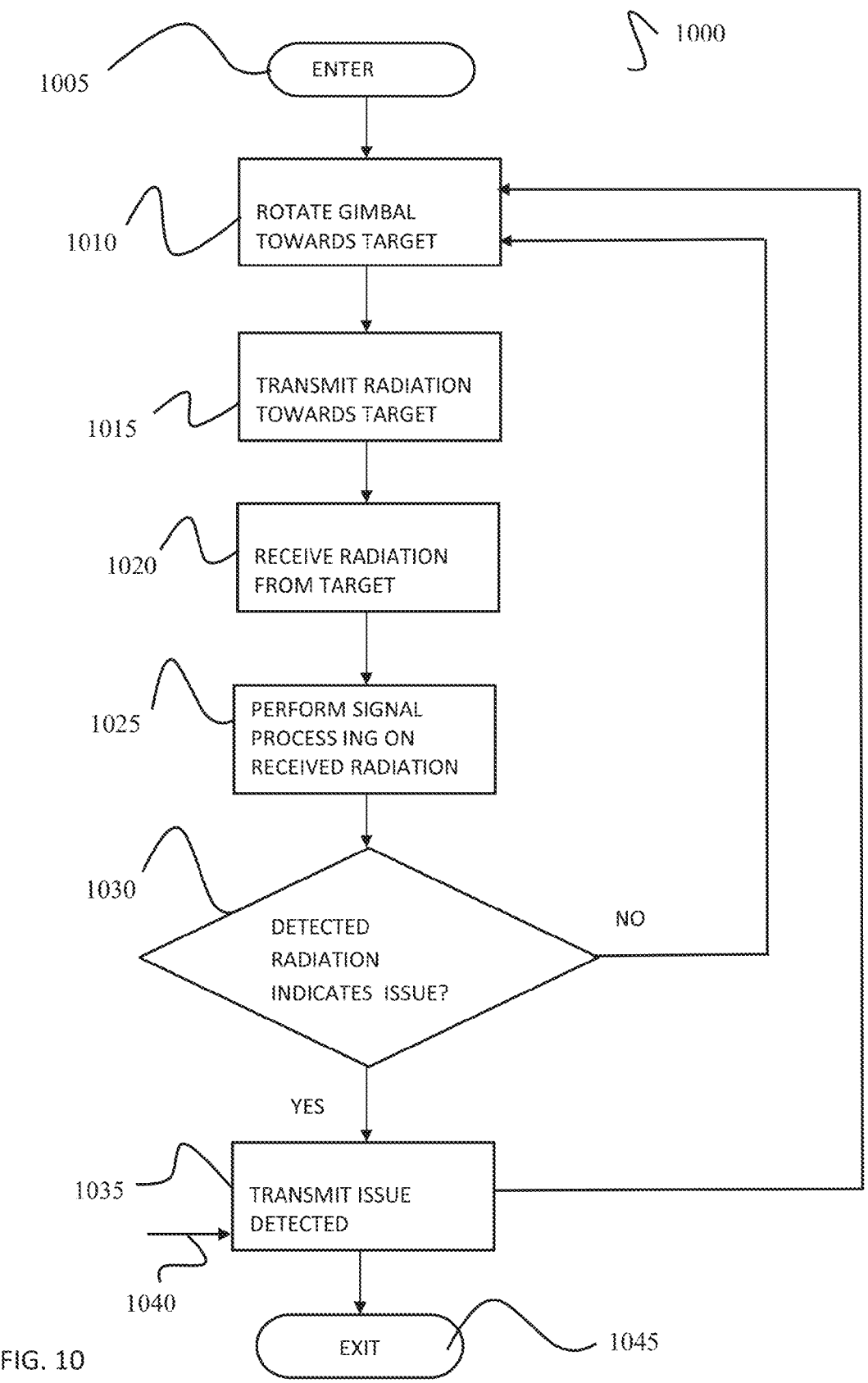
FIG. 10 illustrates an exemplary method of an embodiment.

FIG. 10 illustrates an exemplary method, generally referred to as routine 1000, that runs once enter 1005 is activated. Once routine 1000 is entered, a target is designated using methodologies previously discussed. A computational element may read the target from memory or determine the target from various sensor inputs. Once the target is determined, Rotate Gimbal Towards Target 1010 moves gimbal or gimbals within the street light to orient one or more sensor types (as previously described) within the street light towards the target. Transmit Radiation Towards Target 1015 illuminates the target with either millimeter wave or optical radiation energy. In a manner similar to that described in relation to FIG. 3, scattered radiation will reach another of the street lights equipped with a transmitter/receiver that is compatible with the radiation type being used. Receive Radiation From Target 1020, in an embodiment, will operate within the system to have the other street lights receive the radiation that has scattered from the target. Once the scattered radiation is received, Perform Signal Processing On Received Radiation 1025 will have the system process the radiation to determine if there is snow, water or ice on the target area. The processing may be performed by the receiving street light or the received radiation data may be transferred and processing performed remotely from the receiving street light. In the event that the processing of the received radiation data indicates an issue (such as water, ice or snow) Transmit Issue Detected 1035 will transmit the results of Perform Signal Processing On Received Radiation 1025 to the system to allow for alerts to be made. In the event that Perform Signal Processing On Received Radiation 1025 does not indicate any issues form water, snow or ice on the target area, then the system returns to Rotate Gimbal Towards Target 1010 which will use either computer memory or sensor input such as from an acoustic sensor or image sensor, to orient the transmitter receiver towards the determined target. The Routine 1000 can Exit 1045 if the appropriate signal 1040 is received. The signal 1040 may be a system reset, an interrupt or other indication that the Routine 1000 should be exited.

An exemplary technical effect of the methods and systems described herein includes: (a) generating a melt pool based on the build parameters of the component; (b) detecting an optical signal generated by the melt pool to measure the size or the temperature of the melt pool; and (c) modifying the build parameters in real-time based on the size or the temperature of the melt pool to achieve a desired physical property of the component.

Some embodiments involve the use of one or more electronic or computing devices. Such devices typically include a processor or controller, such as, without limitation, a general purpose central processing unit (CPU), a graphics processing unit (GPU), a microcontroller, a field programmable gate array (FPGA), a reduced instruction set computer (RISC) processor, an application specific integrated circuit (ASIC), a programmable logic circuit (PLC), and/or any other circuit or processor capable of executing the functions described herein.

The methods described herein may be encoded as executable instructions embodied in a computer readable medium, including, without limitation, a storage device, and/or a memory device. Such instructions, when executed by a processor, cause the processor to perform at least a portion of the methods described herein. The above examples are exemplary only, and thus are not intended to limit in any way the definition and/or meaning of the term processor.

Exemplary embodiments for enhancing the build parameters for making additive manufactured components are described above in detail. The apparatus, systems, and methods are not limited to the specific embodiments described herein, but rather, operations of the methods and components of the systems may be utilized independently and separately from other operations or components described herein. For example, the systems, methods, and apparatus described herein may have other industrial or consumer applications and are not limited to practice with electronic components as described herein. Rather, one or more embodiments may be implemented and utilized in connection with other industries.

Although specific features of various embodiments of the invention may be shown in some drawings and not in others, this is for convenience only. In accordance with the principles of the invention, any feature of a drawing may be referenced or claimed in combination with any feature of any other drawing.

This written description uses examples to disclose the invention, including the best mode, and to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

We claim:

1. An outdoor lighting system, comprising:
   a plurality of street lights;
   a luminaire associate coupled to at least some of the street lights and comprising a plurality of luminaire associate components including: a signal processor, a communications device, a radiation transmitter/receiver, and a plurality of mechanical devices associated with the mounting and control of the plurality of street lights;
   at least one gimbal attached to the luminaire associate, the gimbal having a motorized system being operative for controlling the position of the plurality of luminaire associate components and thereby directing the radiation transmitter/receiver for the luminaire associate in a direction of at least one target area on a roadway, wherein the at least one target area is determined using inputs from a plurality of sensors; and
   a controller operatively coupled to the motorized system of the luminaire associate to control movement of the gimbal;
   wherein the signal processor analyzes radiation received by the transmitter/receiver from the at least one target area.

2. The system of claim 1 wherein radiation is transmitted towards the target area from one of the luminaire associates and reflected radiation energy is received by another of the luminaire associate to determine if there is water, ice or snow on the target area.

3. The system of claim 1 further comprising at least one search pattern that the controller operates for the gimbal.

4. The system of claim 1 further comprising at least one security device or security measure, wherein the security device or the security measure is selected from: monitoring a predetermined perimeter delineated by the street lighting system; or authenticating; encrypting communications; or authenticating commands and messages throughout the system.

5. The system of claim 1, wherein the plurality of sensors comprises an image sensor, wherein the image sensor is rotatable by the gimbal.

6. The system of claim 5, wherein the plurality of sensors comprises an acoustic sensor and wherein the signal processor runs an algorithm that analyzes sounds in the vicinity of the street light to provide a location of the target area and controls the gimbal to rotate the image sensor towards the location.

7. The system of claim 1 wherein results of analysis of received radiation by the processor are sent by the communication device to a traffic condition database at a remote location.

8. The system of claim 1 wherein the remote location interfaces with the plurality of street lights and provides control and monitoring of the street lights, and wherein the results are used to adjust operation of the street lights.

9. The system of claim 8 wherein the luminaire associate contain a GPS receiver allowing the system to have knowledge of the locations of the street lights and the target area.

10. The system of claim 9 further comprising a search pattern stored within the luminaire associate that controls the gimbal to rotate the transmitter/receiver to view a sequence of the target areas.

11. A method for detecting situations on a roadway comprising:
    determining a target area on the roadway using inputs from a plurality of sensors;
    controlling movement of at least one gimbal contained within at least a portion of a plurality of street lights, the portion having a radiation transmitter/receiver that moves with the gimbal towards the target area;
    transmitting radiation from the radiation transmitter/receiver towards the target area; receiving radiation reflected from the target area by at least one of the transmitter/receivers; and
    signal processing of received radiation by a computational device within the street light containing the at least one of the transmitter/receivers.

12. The method of claim 11 wherein the signal processing is performed by an algorithm run by the computational device that analyzes received radiation to determine if water, ice or snow is present on the target area.

13. The method of claim 11 wherein receiving further comprises receiving images via an image sensor within the street light to acquire images of the target area.

14. The method of claim 11 further comprising communicating results of signal processing to a traffic condition database at a remote location using a communications device within the street light.

15. The method of claim 14 wherein controlling further comprises controlling the plurality of street lights from the remote location that interfaces with the communications device for the street light.

16. The method of claim 15 wherein controlling further comprises running a search pattern using the gimbals to rotate the transmitter/receiver to view a sequence of the target areas.

17. The method of claim 11 further comprising accessing locations of the street lights and the target area using a GPS receiver within at least one of the street lights.

18. The method of claim 11 wherein controlling further comprises controlling the gimbal in response to sounds received from an acoustic sensor in at least one of the street lights.

19. The method of claim 18 further comprising signal processing sounds received by the acoustic sensor to determine if water, ice or snow is present on the target area.

20. The method of claim 19 further comprising communicating signal processing results to a traffic condition database at the control and monitoring station.

* * * * *